United States Patent Office 3,332,852
Patented July 25, 1967

3,332,852
PROCESS FOR THE RECOVERY OF PLASMINOGEN
FROM BLOOD SERUM OR BLOOD PLASMA
Villy Johannes Jensen, Vanlose, Denmark, assignor to
Novo Terapeutisk Laboratorium A/S, Copenhagen,
Denmark
No Drawing. Filed Mar. 19, 1965, Ser. No. 441,338
Claims priority, application Denmark, Mar. 20, 1964,
1446/64
5 Claims. (Cl. 195—66)

ABSTRACT OF THE DISCLOSURE

A process for recovering plasminogen from animal (pig or ox) blood plasma or serum by diluting 1 to 4 times with water, adding an organic solvent, adjusting the pH to between 4 and 7 and thereby recovering a relatively pure plasminogen precipitate.

---

It is known to recover plasminogen from human blood by after removal of the fibrinogen content of the blood plasma diluting the resultant serum vigorously with water, i.e. more than about 10 times, whereafter at a specific pH there is precipitated, a so-called euglobulin fraction which is worked up to plasminogen.

It has also been found to be possible to recover an animal plasminogen which after activation to plasmin may be used in the human clinic without appreciable risk of anaphylaxia or other harmful effects, when animal serum or plasma, preferably frim pig's blood, is diluted 5 to 8 times with water and is adjusted to a pH-value of 5 to 6, see British Patent No. 1,013,507. In case there is employed a dilution of less than 5 times the plasminogen yield becomes so small that the method is not technically useful.

Furthermore, it has proved possible to precipitate from animal plasma or serum diluted with water technically useful yields of animal plasminogen, which may be worked up to clinically useful plasmin by adding an organic solvent in an amount of at least about 10 percent to animal serum or plasma, preferably from pig's blood or ox blood, at a pH-value of 5 to 9 and at a temperature between the freezing point of the mixture and about 15° C., see British Patent No. 1,066,467.

By analogy with the above mentioned method of dilution it is so that by employing merely a precipitation with an organic solvent in an amount of less than about 10 percent it is not possible to obtain practically useful plasminogen yields.

According to the invention it has now been found that by combining a slight dilution with water with an addition of a small amount of organic solvent it is possible from animal serum or plasma to obtain a plasminogen yield greater than the yields which may be obtained merely by a corresponding slight dilution or merely by the addition of a corresponding small amount of organic solvent.

According to the present invention the instant process for the recovery of plasminogen from blood serum or blood plasma by diluting with water and precipitating with an organic solvent is characteristic in that animal serum or plasma, preferably from pig's blood or ox blood, is diluted 1 to 4 times with water at a temperature between the freezing point of the mixture and about 25° C., such an amount of organic solvent is added that the mixture will contain less than 10 percent by volume thereof, the pH-value of the mixture is adjusted to 4 to 7 and finally, the resulting plasminogen-containing precipitate is separated.

It is true that in literature there is disclosed a method in which plasminogen is precipitated from serum using ethanol and a prior dilution of about 3 times or more, However, in this instance the question is partly of recovering plasminogen from human serum, partly of using relatively high ethanol concentrations of 10 to 15 percent, partly of employing pH-values greater than 7.0.

Defining the degree of dilution $f$, which in the following specific examples has been used as a measure of the dilution, as being the ratio between the volume of the diluted precipitation solution and the volume of the employed amount of serum or plasma, it will be seen that the above dilution of 1 to 4 times corresponds to a degree of dilution $f$ of 2 to 5.

As set forth above the amount of the added organic solvent is to be adjusted in such a manner that the resulting mixture will contain less than 10 percent by volume thereof. The below table shows the volumes of organic solvent which are to be added to 100 ml. of diluted plasma or serum in order to obtain a given percentage of $n$ percent:

| $n$ percent: | ml. of precipitant |
|---|---|
| 2 | 2.04 |
| 4 | 4.17 |
| 6 | 6.38 |
| 8 | 8.70 |

It is noted that hereby regard has not been paid to changes in volume due to the process of mixing or changes in temperature.

Apart from ethanol there may also be employed a series of other organic solvents, e.g. methanol and acetone. Furthermore, experiments seem to show that it is possible with good results to use as well water miscible as slightly water miscible organic solvents for the precipitation. As examples of solvents of the latter type there may be mentioned ether and the organic solvents on the market having a more complicated structure, such as dioxane.

According to the invention it is most appropriate to employ ethanol, methanol or acetone because these are cheap and easily available organic liquids. By working in this manner it is possible to obtain a great plasminogen yield having a high relative specific activity after activation, said activity being defined as 100 times the ratio between the plasmin activity of a given plasminogen-containing precipitate after activation to plasmin, and the content of organic matter of the same precipitate, determined as protein + fats.

Experiments have shown that the activity of the precipitated plasminogen after activation to plasmin, irrespective of the size of the employed degree of dilution within the range of $f=2$ to 5, will attain its maximum value when adding such an amount of organic solvent that the mixture will contain about 8 percent by volume thereof. According to the invention it is consequently especially appropriate that the mixture is brought to contain said amount of organic solvent.

The isoelectric point of the euglobulins which are precipitated in the present process is at pH=about 5.5, and prior experience from precipitation by mere dilution and from precipitation merely using organic precipitants seems to show that precipitation using these methods provides the best results at the mentioned pH-value. Although on the basis of the above one could not beforehand conclude with certainty that a combination of the two methods of precipitation would also result in optimal results at pH 5.5, experiments have, however, shown that this is actually the case. Thus, according to the invention it is especially appropriate that the pH-value of the employed diluted mixture is adjusted to 5.5, although satisfactory results may be obtained at other pH-values in the range from 4 to 7.

The temperature range within which the combined precipitation using dilution and addition of an organic solvent is carried out lies in practice from the freezing point of the employed mixtures up to about 25° C. When low concentrations of organic solvent are used one runs, however, the risk that the mixture will freeze at temperatures lying a few degrees below 0° C. Furthermore, since the risk of denaturation is lowest at the low temperatures, it is according to the invention most appropriate to employ a temperature of 0° C.

The plasminogen-containing precipitate prepared according to the present process may in a manner known per se be worked up to plasminogen and may then be activated to plasmin with e.g. trypsin or urokinase. Since serum contains great amounts of inhibitors it is necessary to wash the resulting precipitates free from supernatant liquid prior to the analysis. Although this washing in case of e.g. precipitation with ethanol may be carried out with mixtures of water and ethanol, it is, however, preferred to wash with distilled water in order to avoid denaturations in an additional ethanol precipitation. Such a washing with distilled water has been found practically not to cause any loss of plasminogen.

The plasma or serum employed as starting material may be prepared in the following manner: Immediately following the drawing-off there is added to the blood a solution containing an anti-coagulation agent, e.g. trisodiumcitrate, and, if desired, one or more antibiotics, e.g. penicillin or streptomycin, followed by cooling. The blood thus treated is centrifuged and the blood corpuscles are removed. The resulting plasma is recalcified by the addition of calcium chloride.

In order to prepare serum the plasma is left with vigorous stirring for some hours whereby the fibrin is precipitated. The latter is separated, and the remaining serum is used for the precipitations.

In all of the experiments described in the following specific examples the employed organic solvent as well as the employed serum or plasma have prior to the precipitation been cooled to the temperature at which the precipitation is carried out. In such instances in which use is made of ethanol the question is of 96 percent ethanol.

*Example 1*

50 ml. of serum from pig's blood is diluted with 50 ml. of distilled water (degree of dilution $f=2$) and 8.70 ml. of 96 percent ethanol are added carefully with stirring, whereby the resulting mixture will contain 8 percent of ethanol. The pH-value of the mixture is adjusted to 5.5, whereafter the mixture is left overnight at a temperature of 0° C., whereby a precipitate is formed. The supernatant liquid is separated by centrifugalization at this temperature, and the separated precipitate is washed with 25 ml. of distilled water at a pH-value of 5.5 and 25° C. The supernatant liquid is discarded, and the washed precipitate is dissolved in 25 ml. of diluted sulfuric acid at a pH-value of 2 to 3. The resulting solution is then analyzed in order to determine the total content of organic matter (protein+fats) as well as the plasmin activity of the precipitated plasminogen after activation, the values of these variables obtained by a corresponding euglobulin pecipitation with water at a degree of dilution of 21, a pH-value of 5.3 and a temperature of 25° C. being fixed at 100, whereafter the amounts found in the experiment are calculated in percent of the reference values.

As the result of the above experiment there is found in this manner a plasmin activity of 82.3 percent, a content of organic matter of 80.7 percent and a relative specific activity of $$\frac{82.3}{80.7} \cdot 100 \text{ percent} = 102 \text{ percent}$$

The results compiled in the following tables have been obtained in a corresponding manner, precipitations of plasminogen-containing precipitates from as well serum as plasma having been made using varying degrees of dilution, organic solvents, temperatures, pH-values and concentrations of precipitant.

TABLE I.—PRECIPITATION OF PIG PLASMINOGEN FROM SERUM BY DILUTING AND ADDING ETHANOL

| Expl. No. | Temp., °C. | Degree of dilution $f$ | Percent ethanol | pH | Percent plasmin activity | Percent organic matter | Percent relative specific activity |
|---|---|---|---|---|---|---|---|
| 2 | 0 | 2 | 2 | 5.5 | 29.6 | 18.2 | 163 |
| 3 | 0 | 2 | 4 | 5.5 | 48.9 | 37.5 | 132 |
| 4 | 0 | 2 | 6 | 5.5 | 66.6 | 56.8 | 119 |
| 5 | 0 | 3 | 2 | 5.5 | 54.5 | 41.4 | 132 |
| 6 | 0 | 3 | 4 | 5.5 | 73.7 | 60.8 | 122 |
| 7 | 0 | 3 | 6 | 5.5 | 89.4 | 77.9 | 116 |
| 8 | 0 | 3 | 8 | 5.5 | 93.7 | 86.6 | 110 |
| 9 | 0 | 4 | 2 | 5.5 | 76.9 | 58.4 | 132 |
| 10 | 0 | 4 | 4 | 5.5 | 94.8 | 75.8 | 126 |
| 11 | 0 | 4 | 6 | 5.5 | 97.9 | 93.7 | 106 |
| 12 | 0 | 4 | 8 | 5.5 | 95.8 | 106 | 90.3 |

The results compiled in the above table show that by employing a long series of combinations of low degree of dilution and small amounts of added ethanol there is obtained as well a relatively high plasmin activity as a limited precipitation of organic matter, i.e. a relatively high relative specific activity.

TABLE II.—PRECIPITATION OF PIG PLASMINOGEN FROM SERUM BY DILUTING AND ADDING ETHANOL AT DIFFERENT pH-VALUES

| Expl. No. | Temp., °C. | Degree of dilution $f$ | Percent ethanol | pH | Percent plasmin activity | Percent organic matter | Percent relative specific activity |
|---|---|---|---|---|---|---|---|
| 13 | 0 | 3 | 6 | 4.0 | 11.9 | 15.4 | 77.7 |
| 14 | 0 | 3 | 8 | 4.0 | 12.1 | 16.8 | 72.1 |
| 15 | 0 | 4 | 6 | 4.0 | 12.3 | 9.7 | 127 |
| 16 | 0 | 4 | 8 | 4.0 | 10.3 | 11.1 | 93.5 |
| 17 | 0 | 3 | 6 | 4.5 | 41.9 | 47.9 | 87.3 |
| 18 | 0 | 3 | 8 | 4.5 | 50.0 | 58.8 | 85.2 |
| 19 | 0 | 4 | 6 | 4.5 | 47.8 | 42.9 | 112 |
| 20 | 0 | 4 | 8 | 4.5 | 36.2 | 50.5 | 71.5 |
| 21 | 0 | 3 | 6 | 5.0 | 98.8 | 63.2 | 158 |
| 22 | 0 | 3 | 8 | 5.0 | 104 | 80.2 | 131 |
| 23 | 0 | 4 | 6 | 5.0 | 96.8 | 69.5 | 140 |
| 24 | 0 | 4 | 8 | 5.0 | 106 | 81.5 | 131 |
| 25 | 0 | 3 | 6 | 6.0 | 54.3 | 59.3 | 91.0 |
| 26 | 0 | 3 | 8 | 6.0 | 77.2 | 77.6 | 99.9 |
| 27 | 0 | 4 | 6 | 6.0 | 64.1 | 65.2 | 98.4 |
| 28 | 0 | 4 | 8 | 6.0 | 79.4 | 79.4 | 101 |
| 29 | 0 | 3 | 6 | 7.0 | 14.3 | 19.2 | 74.7 |
| 30 | 0 | 3 | 8 | 7.0 | 21.4 | 25.3 | 84.4 |
| 31 | 0 | 4 | 6 | 7.0 | 20.4 | 23.9 | 85.0 |
| 32 | 0 | 4 | 8 | 7.0 | 26.2 | 34.8 | 75.3 |

It clearly appears from the above results that by employing pH-values of 5 to 6 there is obtained an especially high plasmin activity in connection with such amounts of organic matter that there is attained a high relative specific activity.

TABLE III.—PRECIPITATION OF PIG PLASMINOGEN FROM SERUM BY DILUTING AND ADDING ETHANOL AT TEMPERATURES ABOVE 0° C.

| Expl. No. | Temp., °C. | Degree of dilution | Percent ethanol | pH | Percent plasmin activity | Percent organic matter | Percent relative specific activity |
|---|---|---|---|---|---|---|---|
| 33 | 15 | 4 | 6 | 5.5 | 67.2 | 56.7 | 118 |
| 34 | 15 | 4 | 8 | 5.5 | 56.8 | 66.2 | 85.6 |
| 35 | 25 | 4 | 6 | 5.5 | 36.9 | 38.4 | 100 |
| 36 | 25 | 4 | 8 | 5.5 | 46.5 | 50.6 | 92.0 |

It appears from Table III that at temperatures substantially above 0° C. there may be obtained satisfactory plasmin activities and relatively high relative specific activities.

TABLE IV.—PRECIPITATION OF PIG PLASMINOGEN FROM SERUM BY DILUTING AND ADDING ORGANIC SOLVENTS OTHER THAN ETHANOL

| Expl. No. | Precipitant | Temp., °C. | Degree of Dilution $f$ | Percent precipitant | pH | Percent plasmin activity | Percent organic matter | Percent Relative specific activity |
|---|---|---|---|---|---|---|---|---|
| 37 | Methanol | 0 | 4 | 8 | 5.5 | 88.6 | 100 | 88.6 |
| 38 | Acetone | 0 | 4 | 8 | 5.5 | 74.3 | 68.2 | 109 |
| 39 | Ether | 0 | 4 | 8 | 5.5 | 88.6 | 74.8 | 119 |

From Table IV it appears that there may also be obtained precipitates having relatively high relative specific activity when other organic precipitants are employed instead of ethanol.

TABLE V.—PRECIPITATION OF PIG PLASMINOGEN FROM PLASMA BY DILUTING AND ADDING ETHANOL

| Expl. No. | Temp., °C. | Degree of dilution $f$ | Percent ethanol | pH | Percent plasmin activity | Percent organic matter | Percent relative specific activity |
|---|---|---|---|---|---|---|---|
| 40 | 0 | 3 | 8 | 5.5 | 101.7 | 148 | 68.7 |
| 41 | 0 | 4 | 6 | 5.5 | 92.9 | 132 | 70.4 |
| 42 | 0 | 4 | 8 | 5.5 | 106.1 | 144 | 73.9 |

It appears from the above Table V that by precipitating pig plasminogen from plasma there are also obtained useful results, even though the specific activity of the formed plasminogen precipitates is somewhat lower than when precipitating from serum, confer the relatively high content of organic matter.

TABLE VI.—PRECIPITATION OF OX PLASMINOGEN FROM SERUM BY DILUTING AND ADDING ETHANOL

| Expl. No. | Temp., °C. | Degree of dilution f | Percent ethanol | pH | Percent plasmin activity | Percent organic matter | Percent relative specific activity |
|---|---|---|---|---|---|---|---|
| 43 | 0 | 2 | 8 | 5.5 | 57.3 | 64.6 | 88.7 |
| 44 | 0 | 3 | 6 | 5.5 | 84.8 | 91.2 | 93.0 |
| 45 | 0 | 3 | 8 | 5.0 | 92.4 | 72.7 | 128 |
| 46 | 0 | 4 | 6 | 5.5 | 45.5 | 51.4 | 87.7 |
| 47 | 0 | 4 | 8 | 6.0 | 99.8 | 130 | 77.1 |

It appears from Table VI that by diluting serum from ox blood and subsequently adding ethanol there may also be obtained satisfactory yields of plasminogen having a relatively high relative specific activity.

Although the experiments upon which the above specific examples are based have been carried out by diluting and subsequently adding the organic solvent, i.e. the process preferred in practice, there is nothing to prevent carrying out instead the dilution and the addition of the organic solvent simultaneously. Furthermore, the precipitation may also be carried out by addition of the organic solvent and subsequent dilution.

The adjustment of the pH-value of the precipitation mixture may be carried out at any time. Thus, for example, already when diluting the mixture may be adjusted to such a pH-value that the final value will be in the range of pH 4 to 7. It is also possible to add the agent used in adjusting the pH together with the organic solvent when the latter is added subsequent to the dilution.

I claim:

1. A process for the recovery of plasminogen from a blood component of the group consisting of pig and ox blood serum and blood plasma, comprising diluting the blood component 1 to 4 times with water at a temperature between the freezing point of the mixture and about 25° C., adding such an amount of organic solvent for precipitating a plasminogen-containing composition from the mixture that the mixture will contain 2 to 10 percent by volume thereof, adjusting the pH-value of the mixture to 4 to 7 and separating the resulting plasminogen-containing precipitate.

2. A process as claimed in claim 1, in which the amount of the organic solvent added is such that the mixture will contain about 8 percent by volume thereof.

3. A process according to claim 1, in which the organic solvent is of the group consisting of ethanol, methanol and acetone.

4. A process according to claim 1, in which the pH-value to which the mixture is adjusted is 5.5.

5. A process according to claim 1 in which the temperature is about 0° C.

References Cited

UNITED STATES PATENTS 2,922,745  1/1960  Singher et al. _____ 167—65

OTHER REFERENCES

Cohn, E. J., et al.: J.A.C.S. March 1946, vol. 68, pages 459 to 475.

A. LOUIS MONACELL, *Primary Examiner.*

L. M. SHAPIRO, *Assistant Examiner.*